(12) United States Patent
Jatzke

(10) Patent No.: US 8,740,157 B2
(45) Date of Patent: Jun. 3, 2014

(54) FASTENING DEVICE FOR A LEAD

(75) Inventor: Stefan Jatzke, Ebertsheim (DE)

(73) Assignee: TRW Automotive Electronics & Components GmbH, Enkenbach-Alsenborn (DE)

( * ) Notice: Subject to any disclaimer, the term of this patent is extended or adjusted under 35 U.S.C. 154(b) by 0 days.

(21) Appl. No.: 11/973,916

(22) Filed: Oct. 11, 2007

(65) Prior Publication Data

US 2008/0087774 A1  Apr. 17, 2008

(30) Foreign Application Priority Data

Oct. 12, 2006  (DE) ............... 20 2006 015 674 U

(51) Int. Cl.
| | | |
|---|---|---|
| F16B 15/00 | (2006.01) | |
| H02G 3/32 | (2006.01) | |
| F16B 21/08 | (2006.01) | |
| B60R 16/02 | (2006.01) | |
| F16L 3/127 | (2006.01) | |

(52) U.S. Cl.
CPC ............ H02G 3/32 (2013.01); F16B 21/084 (2013.01); B60R 16/0215 (2013.01); F16L 3/127 (2013.01)
USPC ............. 248/71; 248/73; 248/65; 24/115 R

(58) Field of Classification Search
CPC ............ H02G 3/32; H02G 3/36; H02G 3/00; H02G 3/26; H02G 3/30; F16B 21/084; F16B 21/082; F16B 21/00; F16L 3/04; F16L 3/127; B60R 16/0215
USPC .......... 248/49, 65, 68.1, 73, 74.1, 71, 74.2, 248/74.3; 411/508, 509, 510; 24/115 R, 24/130, 131 R, 129 R
See application file for complete search history.

(56) References Cited

U.S. PATENT DOCUMENTS

| | | | |
|---|---|---|---|
| 2,189,364 A | | 2/1940 | Kirsten |
| 2,613,051 A | | 10/1952 | Baum |
| 2,687,329 A | | 8/1954 | Hunter |
| 4,673,151 A | | 6/1987 | Pelz |
| 4,840,334 A | * | 6/1989 | Kikuchi ................. 248/73 |
| 4,909,462 A | | 3/1990 | Usui |
| 4,997,147 A | | 3/1991 | Velke, Sr. et al. |
| 5,014,939 A | * | 5/1991 | Kraus et al. ............. 248/70 |
| 5,333,821 A | | 8/1994 | Lee |
| 5,765,959 A | * | 6/1998 | Shioda ................. 403/199 |
| 5,799,906 A | * | 9/1998 | Hillegonds ............. 248/49 |
| 6,076,781 A | * | 6/2000 | Kraus ..................... 248/73 |
| 6,134,754 A | * | 10/2000 | Hansson et al. ........ 24/115 R |
| 7,017,866 B2 | * | 3/2006 | Whorton ................ 248/71 |
| 7,055,783 B2 | * | 6/2006 | Rosemann et al. ...... 248/71 |
| 7,365,807 B2 | * | 4/2008 | Iwai ..................... 348/794 |

FOREIGN PATENT DOCUMENTS

| | | |
|---|---|---|
| CH | 571674 | 7/1973 |
| DE | 3933305 | 4/1991 |
| DE | 3838822 | 8/1991 |

(Continued)

*Primary Examiner* — Todd M Epps
(74) *Attorney, Agent, or Firm* — Tarolli, Sundheim, Covell & Tummino LLP

(57) ABSTRACT

A fastening device (10) for a lead has a fastening portion (14) for mounting the fastening device (10) on a support, and a support portion (12) for the lead. The fastening device (10) further has at least one additional holding portion (16) extending from the support portion (12) for pre-fixing the fastening device (10) on the lead.

25 Claims, 2 Drawing Sheets

(56) References Cited

FOREIGN PATENT DOCUMENTS

| DE | 9310920.2 | 10/1993 |
| DE | 19548079 | 6/1997 |
| DE | 102004007373 | 11/2004 |
| FR | 2691226 | 5/1992 |
| FR | 2677730 | 12/1992 |
| GB | 1084047 | 10/1964 |
| KR | 199852796 | 9/1998 |

* cited by examiner

FASTENING DEVICE FOR A LEAD

FIELD OF THE INVENTION

The invention relates to a fastening device for a lead.

BACKGROUND OF THE INVENTION

Various fastening devices are known for fastening a lead such as, for instance, a hydraulic lead or an electric lead in the form of a cable or cable line on a support, particularly on the body of a vehicle. A lead may be mounted for example on a track, the track being clipped to an edge of the vehicle body by an adjoining clip section. Cable fastenings in two parts are also known, which consist of a track and a base part. The base parts engage into holes which are provided in the vehicle body, in order to fasten the tracks with the cable on the vehicle body. However, the two-part fastening devices generally have the disadvantage that they first have to be assembled.

It is an object of the invention to provide a fastening device for a lead which is easy to handle, favourably priced and facilitates mounting on a support.

BRIEF SUMMARY OF THE INVENTION

According to the invention, a fastening device has a fastening portion for mounting the fastening device on a support, and a support portion for the lead. The fastening device further has at least one additional holding portion extending from the support portion for pre-fixing the fastening device on the lead. The invention is based on the finding that the fastening of a lead on a support by a mechanic is able to be carried out substantially more quickly and simply when the fastening device can be prefixed on the lead. The holding portion which is additionally provided according to the invention makes it possible to mount the fastening device in a simple manner provisionally on the lead before fastening on the support. The position of the fastening device on the lead can be corrected if necessary before the fastening device is finally mounted with its fastening portion on the support. If necessary, in addition to fixing by the holding portion, the lead may be additionally connected with the fastening device in another way.

According to the preferred embodiment of the invention, two holding portions extending in opposite directions are provided. This makes a more stable fixing possible on the lead.

A holding portion which is constructed so that the lead can be clamped between the support portion and the holding portion makes a particularly simple prefixing possible without further auxiliary means. The pre-fixing can also be easily detached.

The holding portion preferably has a holding bracket which extends transversely over the lead. The holding bracket can be connected with the support portion via an arm extending along the lead. The arm can be used as a fastening track and guide for the lead when a secure mounting of the lead on the fastening device is provided with an adhesive tape or suchlike.

An elastically deformable holding portion provides for a simple handling and stabilizing of the fastening device on the lead.

In order to prevent an undesired slipping of the fastening device on the lead, the support portion can have several ribs acting as a security against displacement.

DETAILED DESCRIPTION OF THE PREFERRED EMBODIMENT

Figure 1:
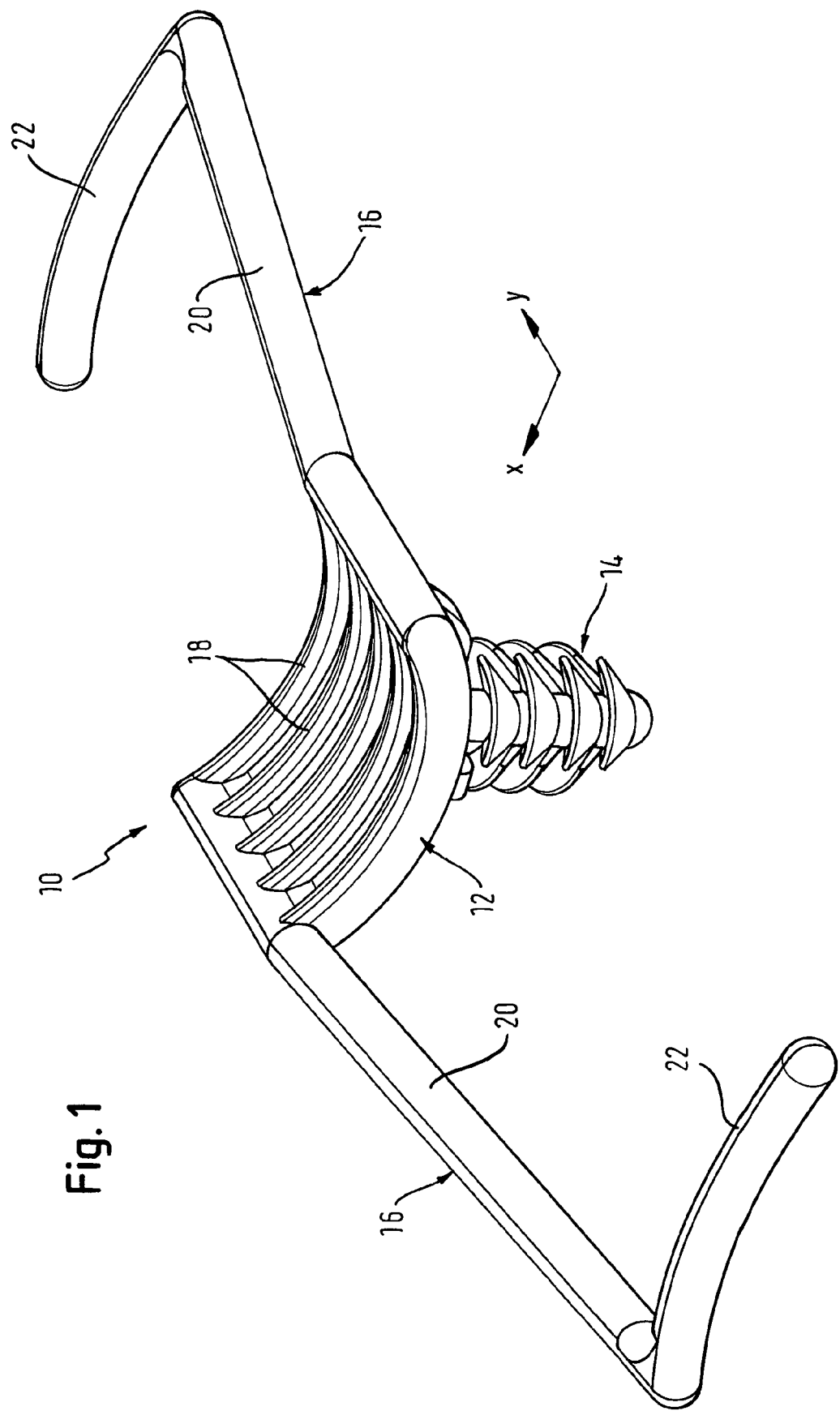
FIGS. 1 and 2 show two different perspective views of a fastening device according to the invention.
Figure 2:
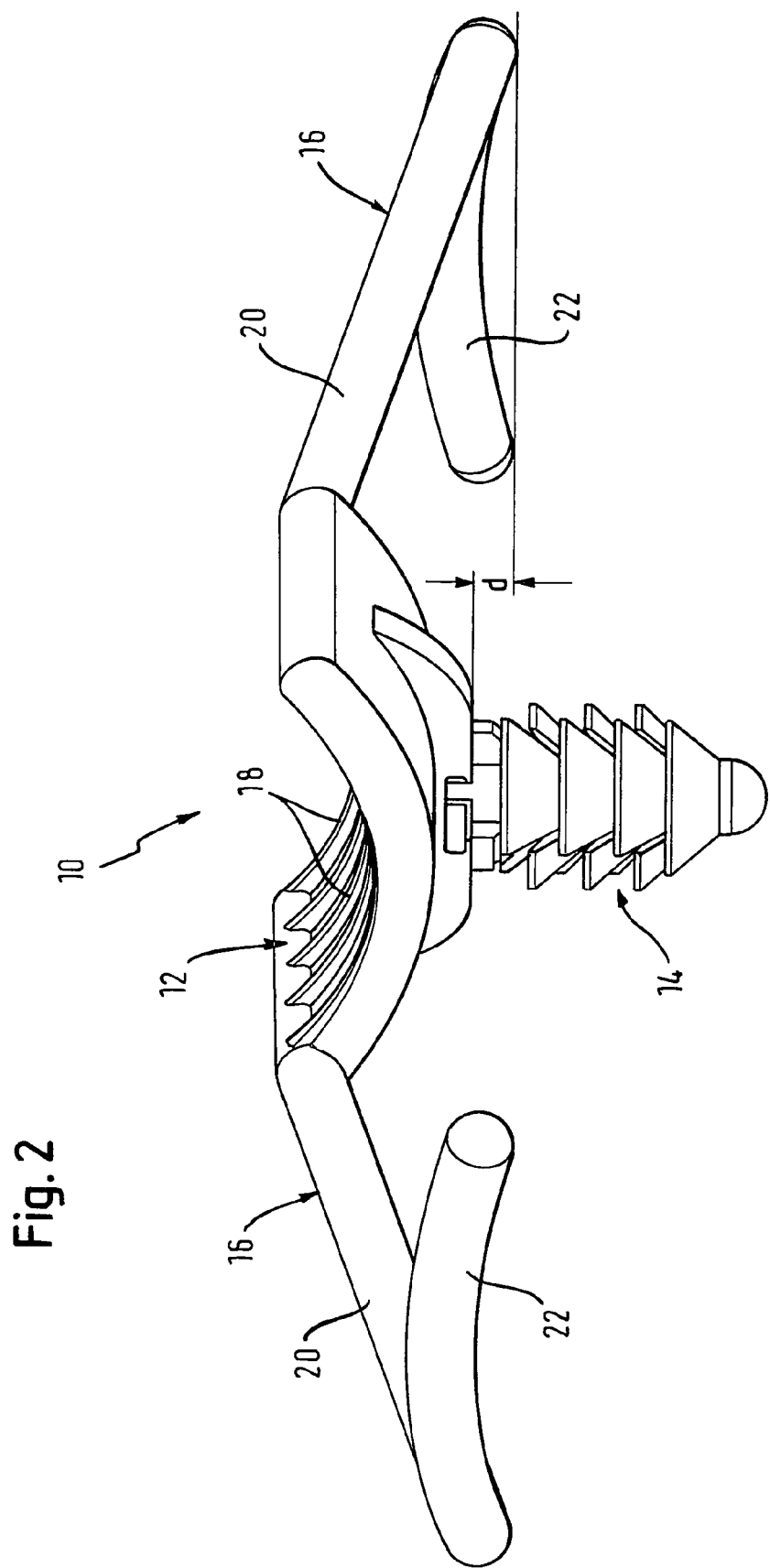

The fastening device 10 illustrated in FIGS. 1 and 2 is made of plastic and has a support portion 12, which is to be fastened to a support for a lead. The device 10 further has a fastening portion 14 and two holding portions 16. The fastening portion 14 extends from the side of the support portion 12 facing away from the lead and serves to fasten the fastening device 10 to the support. The fastening portion 14 can be constructed differently, depending on the type of fastening which his provided (in a bore, on a threaded bolt, on the edge of a metal sheet, etc.).

The support portion 12 is curved relative to a transverse direction x and has a concave support surface for the lead on the side facing away from the fastening portion 14. In the illustrated example embodiment the support surface is formed by several ribs 18 arranged in parallel, which extend in the transverse direction x.

The two holding portions 16 extend in opposite directions from diametral ends of the support portion 12. The holding portions 16 are composed of an elastically deformable (flexible) elongated arm 20 and a bracket 22 which is curved relative to the transverse direction x, the curvature of the bracket 22 being opposed to the curvature of the support portion 12. As can be seen in particular in FIG. 2, the arms 20 are inclined with respect to a longitudinal direction y perpendicular to the transverse direction x towards the fastening portion 14 (i.e. downwards in accordance with the illustration of FIG. 2). The difference in height between the lowermost point of the support portion 12 and the lower ends of the brackets 22 is designated by reference sign d in FIG. 2.

For fastening the lead on the support the fastening device 10 is initially pre-fixed on the lead. To do this, the lead is placed in the longitudinal direction y onto the support surface 18 and the two holding brackets 22 are placed onto the lead according to their curvature. Owing to the inclination of the elongated arms 20, a clamping force acts between the brackets 22 and the support portion 12 onto the lead, so that the fastening device 10 is fixed on the lead. The clamping force is determined largely by the height difference d. The ribs 18 of the support portion 12 counteract a slipping of the fastening device 10 on the lead in the longitudinal direction y. Nevertheless, the position of the fastening device 10 can still be altered as desired after the pre-fixing, because this prefixing can be detached without difficulty. For the final fastening of the lead on the support, the fastening device 10 is then mounted on the support using the fastening portion 14. If the clamping force of the holding portions 16 is not sufficient or an additional securing is intended, the lead can be connected by a cable connector, a cable clip, an adhesive tape or in another way using the arm 20 which in this case serves as a track.

The fastening device 10 according to the invention can be advantageously produced as a single piece part by injection molding. The fastening device 10 is not only to be used in the motor vehicle field, but particularly also in electrical equipment such as, for example, refrigerators, ovens, washing machines, dishwashers, driers etc. (so-called white goods).

The invention claimed is:

1. A fastening device for a lead, the fastening device comprising a fastening portion for mounting the fastening device on a support, and a support portion having a first side for receiving the lead and a second side from which the fastening portion extends, the fastening device further comprising at least one holding portion extending from the support portion and having a holding bracket that extends transversely over the lead, the holding portion being irremovably connected to the support portion when the lead is disconnected from the support portion, the holding portion being configured to pre-fix the fastening device on the lead such that the fastening device is fixed to the lead in a manner that allows the position of the fastening device relative to the lead to be altered, the holding portion extending downwardly to a position located on the second side of the support portion when the lead is disconnected from the support portion.

2. The fastening device according to claim 1 comprising another holding portion, said holding portions extending in opposite directions.

3. The fastening device according to claim 1, wherein the holding portion includes a resilient arm that is constructed so that the lead can be clamped between the support portion and the holding portion and a clamping force acting on the lead between the holding portion and the support portion is caused by the resilience of the arm of the holding portion.

4. The fastening device according to claim 1, wherein the holding portion has an elongated holding bracket which extends transversely over the lead, said holding bracket being formed in one piece with the holding portion.

5. The fastening device according to claim 4, wherein the holding bracket portion includes an elongated arm that extends along the lead and connects the holding bracket with the support portion.

6. The fastening device according to claim 1, wherein the support portion has several ribs formed on a side of the support portion facing the lead when the lead is pre-fixed to the fastening device, said ribs acting as a security against displacement.

7. The fastening device according to claim 1, wherein the holding portion in its entirety inclines in the direction of the fastening portion as the holding portion extends from the support portion before the holding portion and support portion are pre-fixed to the lead.

8. The fastening device according to claim 7, wherein the fastening portion extends from the support portion in an axial direction, the holding portion including a holding bracket that has a lower end for holding the lead which is spaced from the lowermost point of the support portion in the axial direction.

9. The fastening device according to claim 1, wherein the fastening device is detachably connected to the lead when the fastening device is pre-fixed to the lead.

10. The fastening device according to claim 1, wherein the support portion is curved, the holding portion including a bracket that is curved in a direction opposite to the curved support portion.

11. The fastening device according to claim 1, wherein the holding portion has an arm and a holding bracket connected non-rotatably to the arm.

12. The fastening device according to claim 11, wherein the support portion defines a longitudinal direction in which the lead is to be placed on the support portion, the holding bracket being curved relative to a transverse direction perpendicular to the longitudinal direction.

13. The fastening device according to claim 1, wherein the holding portion acts to maintain the lead in engagement with the support portion and the holding portion.

14. The fastening device according to claim 1, wherein the at least one holding portion comprises a pair of holding portions that engage the same lead to pre-fix the lead to the support portion of the fastening device.

15. The fastening device according to claim 1, wherein the at least one holding portion extends directly from the support portion.

16. The fastening device according to claim 1, wherein the at least one holding portion and the support portion receive a single lead.

17. A fastening device for a lead, the fastening device comprising:
 a support portion having a first side for engaging the lead when the lead is pre-fixed to the fastening device and a second side,
 a fastening portion extending from the second side of the support portion for connecting the fastening device to a support; and
 a one-piece holding portion extending from the support portion and irremovably connected to the support portion, the holding portion having a portion clamping the lead to the support portion when the lead is pre-fixed to the fastening device, the holding portion being formed by an arm and a holding bracket connected non-rotatable to the arm, the holding portion extending downwardly to a position located on the second side of the support portion when the lead is disconnected from the support portion.

18. The fastening device according to claim 1, wherein the holding portion is substantially L-shaped.

19. The fastening device according to claim 17, wherein the holding portion is substantially L-shaped.

20. The fastening device according to claim 17, wherein the support portion is curved and the holding bracket is curved in a direction opposite to the curved support portion.

21. The fastening device according to claim 17, wherein the support portion defines a longitudinal direction in which the lead is to be placed on the support portion, the holding bracket being curved relative to a transverse direction perpendicular to the longitudinal direction.

22. The fastening device according to claim 17, wherein the holding portion acts to maintain the lead in engagement with the support portion and the holding portion.

23. The fastening device according to claim 17, wherein the at least one holding portion comprises a pair of holding portions that engage the same lead to pre-fix the lead to the support portion of the fastening device.

24. The fastening device according to claim 17, wherein the at least one holding portion extends directly from the support portion.

25. The fastening device according to claim 17, wherein the at least one holding portion and the support portion receive a single lead.

* * * * *